US011926149B2

(12) United States Patent
Chang

(10) Patent No.: US 11,926,149 B2
(45) Date of Patent: Mar. 12, 2024

(54) PRINTER

(71) Applicant: Top Vending Machine Electronics Co., Ltd., Taoyuan (TW)

(72) Inventor: Yuan-Fong Chang, Taoyuan (TW)

(73) Assignee: Top Vending Machine Electronics Co., Ltd., Taoyuan (TW)

( * ) Notice: Subject to any disclaimer, the term of this patent is extended or adjusted under 35 U.S.C. 154(b) by 177 days.

(21) Appl. No.: 17/709,626

(22) Filed: Mar. 31, 2022

(65) Prior Publication Data

US 2023/0311544 A1 Oct. 5, 2023

(51) Int. Cl.
*B41J 11/70* (2006.01)

(52) U.S. Cl.
CPC .................................... *B41J 11/70* (2013.01)

(58) Field of Classification Search
None
See application file for complete search history.

*Primary Examiner* — Alejandro Valencia
(74) *Attorney, Agent, or Firm* — Best & Flanagan LLP

(57) ABSTRACT

A printer includes a paper roll, a printing device, a paper cutting device, a paper output device, and a panel, which are disposed, from rear to front in sequence, on a frame. The printing device includes a printer seat on which a printer head, a paper delivering roller, and a guiding member are disposed. The guiding member forms a paper insertion gap between a guiding piece and a printer seat. The paper insertion gap can smoothly guide a front end of a paper sheet to be inserted downwards to contact with a paper delivering roller. Then, the guiding member pivots back to a positioned state. Thus, the paper sheet can be conveniently and rapidly installed. A paper guiding gap is formed between at least one guiding roller and the printer seat. The paper delivering roller can reliably pull the paper sheet to pass through a printer head for printing.

10 Claims, 13 Drawing Sheets

PRINTER

BACKGROUND OF THE INVENTION

The present invention relates to a printer and, more particularly, to an improved printer capable of stably guiding movement of a paper sheet for printing.

An ordinary automatic processing machine, such as an automated teller machine, a vending machine, etc. generally includes a printer. When a user has completed the operation, the automatic processing machine transmits associated processing information to the printer which prints the associated information and message on a paper sheet of a paper roll, and the front end of the paper sheet is exposed outside of a panel of the printer, such that the user can fetch a detailed list or receipt after printing.

However, the paper sheet is curly and, thus, causes inconvenience when installing the paper sheet in a printer. Furthermore, movement of the paper sheet and printing are also adversely affected by the curly paper sheet. Furthermore, the operating status of the printer cannot be shown on the panel. Thus, a need exists for a novel printer that mitigates and/or obviates the above drawbacks.

BRIEF SUMMARY OF THE INVENTION

An objective of the present invention is to provide a printer including a guiding member that forms a paper insertion gap between a guiding piece and a printer seat. The paper insertion gap can smoothly guide a front end of a paper sheet to be inserted downwards to contact with a paper delivering roller. Then, the guiding member pivots back to a positioned state. Thus, the paper sheet can be conveniently and rapidly installed. Furthermore, a paper guiding gap is formed between at least one guiding roller and the printer seat, such that the paper delivering roller can reliably pull the paper sheet to pass through a printer head for printing.

Another objective of the present invention is to provide a printer including a light-permeable panel lid and an indicating light unit which are disposed on a panel. The indicating light unit emits light towards the panel lid to indicate the operating status of the printer, and the panel lid prevent unauthorized detachment.

To achiever the above objectives, the present invention provides a printer comprising a frame, a paper roll, a printing device, a paper cutting device, a paper output device, and a panel, with the paper roll, the printing device, the paper cutting device, the paper output device, and the panel disposed, from rear to front in sequence, on the frame, wherein the paper roll includes a paper sheet mounted around a spool having two ends rotatably mounted to two sides at a rear section of the frame, wherein the printing device includes a printer seat, a printer head, a paper delivering roller, and a motor, wherein the printer seat is disposed on an intermediate section of the frame, wherein a guiding board extends rearwards from a front side of an upper section of the printer seat, wherein two limiting boards are disposed on two sides of the guiding board, wherein the printer head is disposed on a front side of a lower section of the printer seat, wherein the paper delivering roller is rotatably mounted to the printer head, wherein the motor is configured to drive the paper delivering roller which pulls the paper sheet of the paper roll to pass through the guiding board and the printer head for printing, wherein the paper cutting device is disposed on a front section of the frame, wherein the paper cutting device includes a paper input passage and a paper cutter, wherein the paper sheet of the paper roll moves forwards to pass through the paper input passage, wherein the paper output device includes a paper output seat and a paper output cover, wherein a paper output passage is defined between the paper output seat and the paper output cover, wherein a rear end of the paper output passage intercommunicates with the paper input passage of the paper cutting device, wherein the panel is disposed on a front end of the frame, wherein a paper outlet is formed in a lower section of the panel and intercommunicates with a front end of the paper output passage, characterized in that:

each of the two limiting boards of the printer seat includes a first engaging hole located above the guiding board, wherein each of the two limiting boards further includes an axle hole in front of the guiding board, wherein the printing device further includes a guiding member having a guiding body extending in a transverse direction, wherein the guiding body further includes two axles respectively on two ends thereof, wherein the two axles are pivotably coupled in the axle holes of the two limiting boards, wherein the guiding body includes a guiding piece extending forwards, wherein at least one guiding roller is rotatably mounted to a rear side of the guiding body, wherein each of the two ends of the guiding body further includes a retaining arm extending upwards and having a first engaging block, wherein each first engaging block is engageable with an associated first engaging hole to form a positioned state, such that a paper guiding gap is formed between the at least one guiding wheel and the guiding board and is adjacent to the front side of the guiding board, thereby guiding the paper sheet to contact with the guiding board and the at least one guiding wheel and to pass in between the guiding board and the at least one guiding wheel, and wherein the paper delivering roller pulls the paper sheet forward to pass through the printer head for printing, wherein when a new paper sheet is installed around the spool of the paper roll, the first engaging blocks of the retaining arms are disengaged from the first engaging holes to form an unpositioned state, the guiding body is pivotable forward to pivot the at least one guiding roller forwards and upwards away from the guiding board, and the guiding piece is pivotable rearwards and downwards to a position adjacent to a lower section of the guiding board, forming a paper insertion gap for guiding the new paper sheet to pass therethrough, such that a front end of the new paper sheet is capable of being guided downwards to contact with the guiding piece and the guiding board and to pass in between the guiding piece and the guiding board to thereby contact with the paper delivering roller, and wherein the guiding body is then pivotable rearwards back to the positioned state, completing installation of the new paper sheet.

In an example, the front side of the guiding board of the printer seat includes an arcuate portion corresponding to the at least one guiding roller. When the guiding body is in the positioned state, a rear edge of the at least one guiding roller enters the arcuate portion, and the paper sheet contacts with the at least one guiding roller and the arcuate portion and is passable in between the at least one guiding roller and the arcuate portion.

In an example, a micro switch is disposed on the rear side of the printer seat. An activation arm protrudes rearwards from one of the two ends of the guiding body and extends rearwards beyond a side of the guiding board. When the guiding body is in the positioned state, a distal end of the activation arm activates the micro switch.

In an example, each of the two limiting boards of the printer seat includes a stop wall on an inner side thereof. Each of the two ends of the guiding body includes a stop block corresponding to a respective stop wall. When the guiding body is in the unpositioned state, each stop block abuts downwards against an associated stop wall.

In an example, the printer further comprises two springs. Each of the two springs is provided between one of two sides of the printer seat and the guiding body. When the guiding body is in the unpositioned state, each spring pushes the guiding body to pivot forwards.

In an example, each of the two springs includes a coiled portion at an intermediate portion thereof and two tangs extending from two ends of the coiled portion. The printer further comprises two screws, wherein each of the two screws extends through one of the two limiting boards into the coiled portion of an associated spring whose two tangs press against the printer seat and the guiding body, respectively.

In an example, the paper output seat is fixed to the front side of the paper cutting device and the frame. The paper output seat includes two second engaging holes respectively formed in two sides of a top portion of the paper output seat. The paper output cover covers the paper output seat from top to bottom and is mounted to the paper output seat. The paper output cover includes two elastic retaining arms respectively extending upwards from two sides of a top portion of the paper output cover. Each of the two elastic retaining arms includes a second engaging block engaged in an associated second engaging hole for positioning.

In an example, the paper output seat includes two positioning grooves formed in two sides of an upper section of the paper output seat. Each of the two positioning grooves has an upwardly facing opening. The paper output cover includes two positioning protrusions formed on an upper section of the paper output cover.

In an example, the panel includes two fixing boards respectively extending rearwards from two sides of the panel. Each of the two fixing boards includes a plurality of fixing holes and a plurality of guiding grooves. Each of the plurality of guiding grooves extends rearwards from an associated fixing hole. The frame includes a plurality of fixing protrusions on two sides of the front section of the frame. Each of the plurality of fixing protrusions extends through an associated guiding groove and engages with an associated fixing hole.

In an example, the front panel includes a front side having a receiving space and a panel lid that is permeable to light. An indicating light unit and a plurality of third engaging holes are disposed around the receiving space. The panel lid includes a plurality of third engaging blocks engaged in the plurality of third engaging holes for positioning. The panel lid covers the receiving space and the indicating light unit.

The present invention will become clearer in light of the following detailed description of illustrative embodiments of this invention described in connection with the drawings.

DETAILED DESCRIPTION OF THE INVENTION

Figure 1:
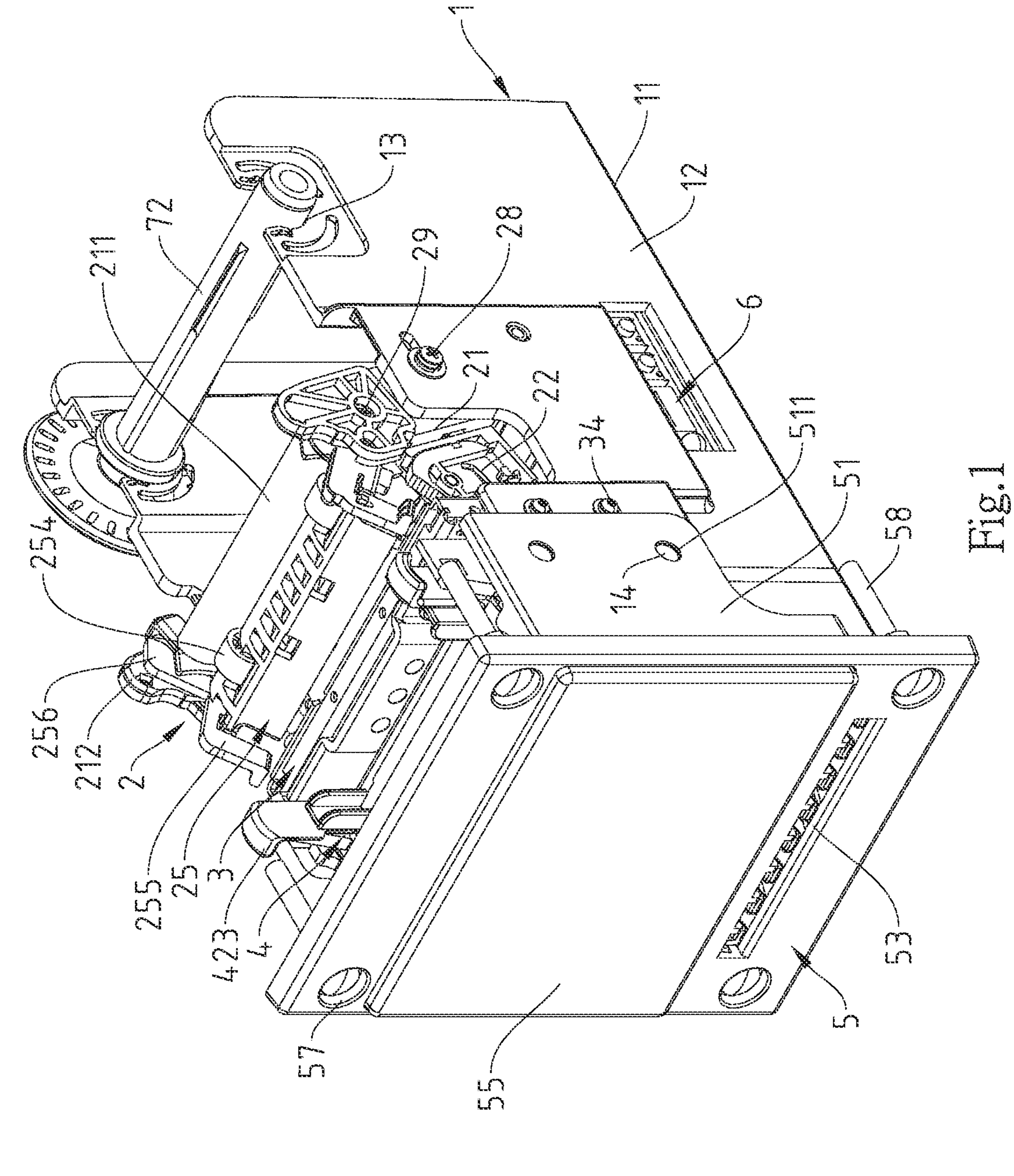
FIG. 1 is a top, perspective view of a printer of an embodiment according to the present invention with a guiding member of a printing device of the printer in an unpositioned state.
Figure 2:
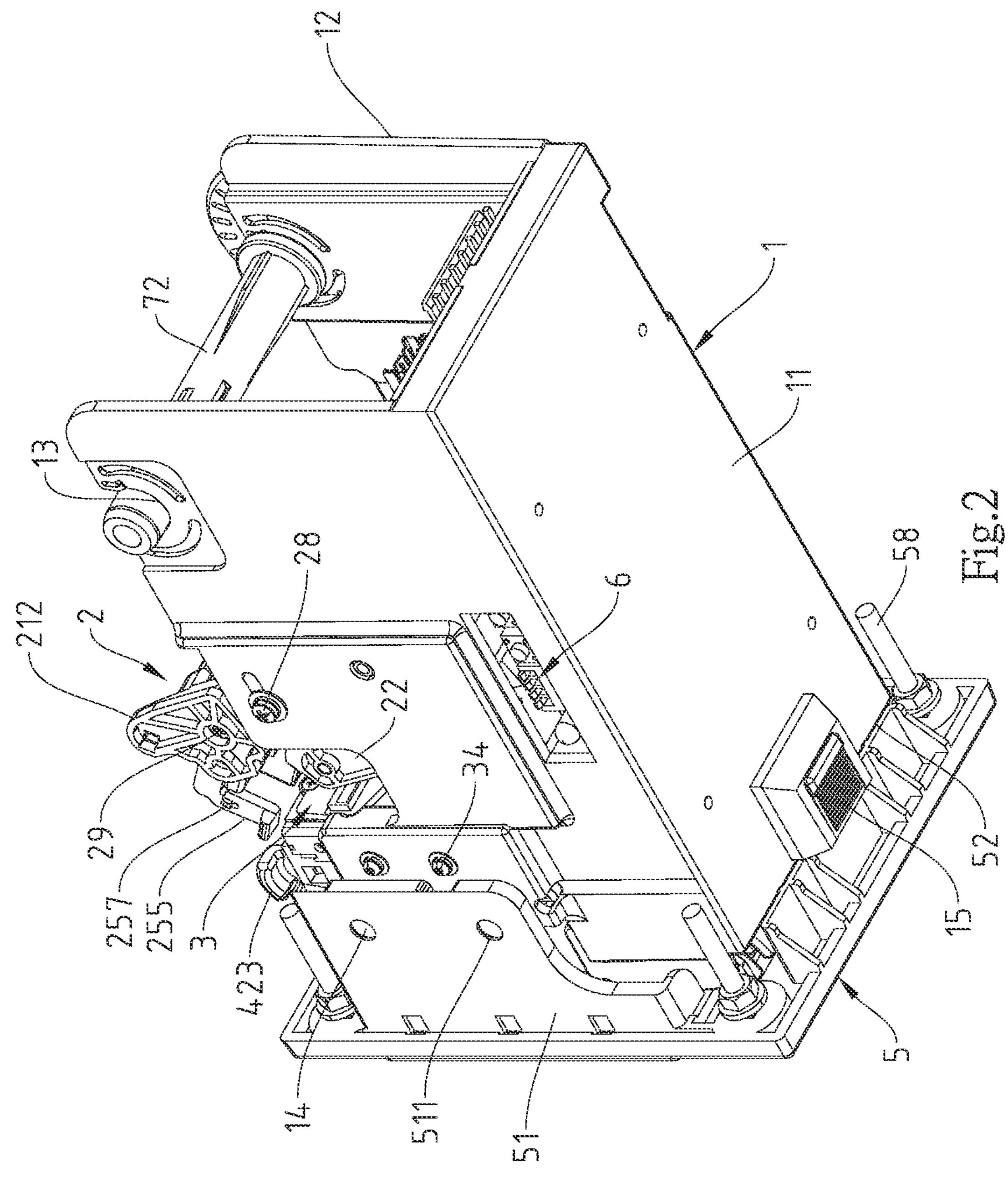
FIG. 2 is a bottom, perspective view of the printer of the embodiment according to the present invention.

With reference to FIGS. 1-10, a printer of an embodiment according to the present invention comprises a frame 1, a paper roll 7, a printing device 2, a paper cutting device 3, a paper output device 4, and a panel 5, with the paper roll 7, the printing device 2, the paper cutting device 3, the paper output device 4, and the panel 5 disposed, from rear to front in sequence, on the frame 1. Furthermore, a circuit module 6 is disposed in the frame 1.

The frame 1 includes a frame seat 11 having two side boards 12. Furthermore, a coupling member 15 (see FIGS. 2 and 9) is disposed on a front end of the frame seat 11. The paper roll 7 includes a paper sheet 71 mounted around a spool 72 (see FIG. 9). The spool 72 has two ends rotatably mounted to two pivotal portions 13 on a rear section of the two side boards 12 of the frame 1.

Figure 5:
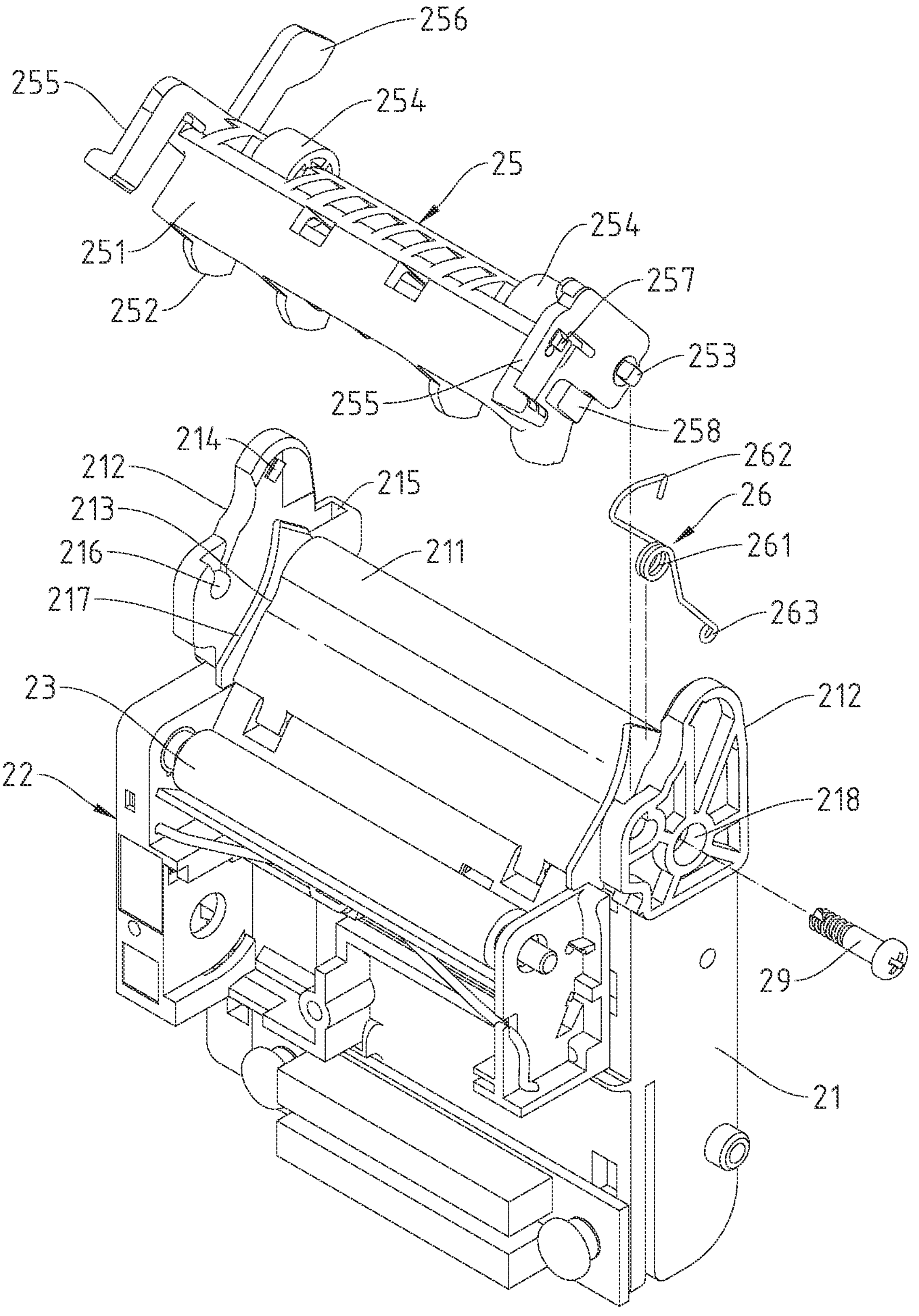
FIG. 5 is an exploded, perspective view of the printing device and the guiding member of the printer of the embodiment according to the present invention.
Figure 9:
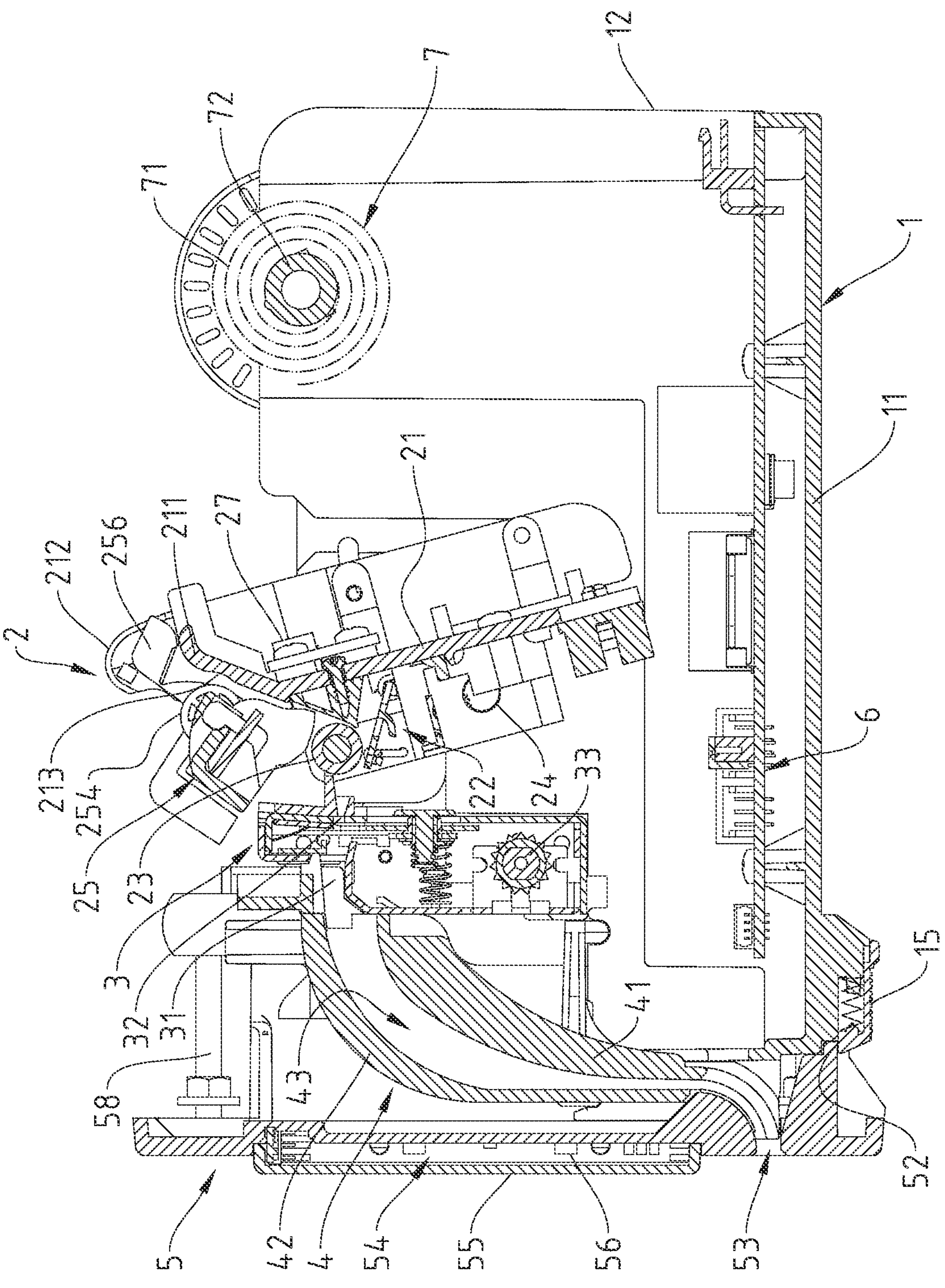
FIG. 9 is a cross sectional view of the printer of the embodiment according to the present invention.
Figure 10:
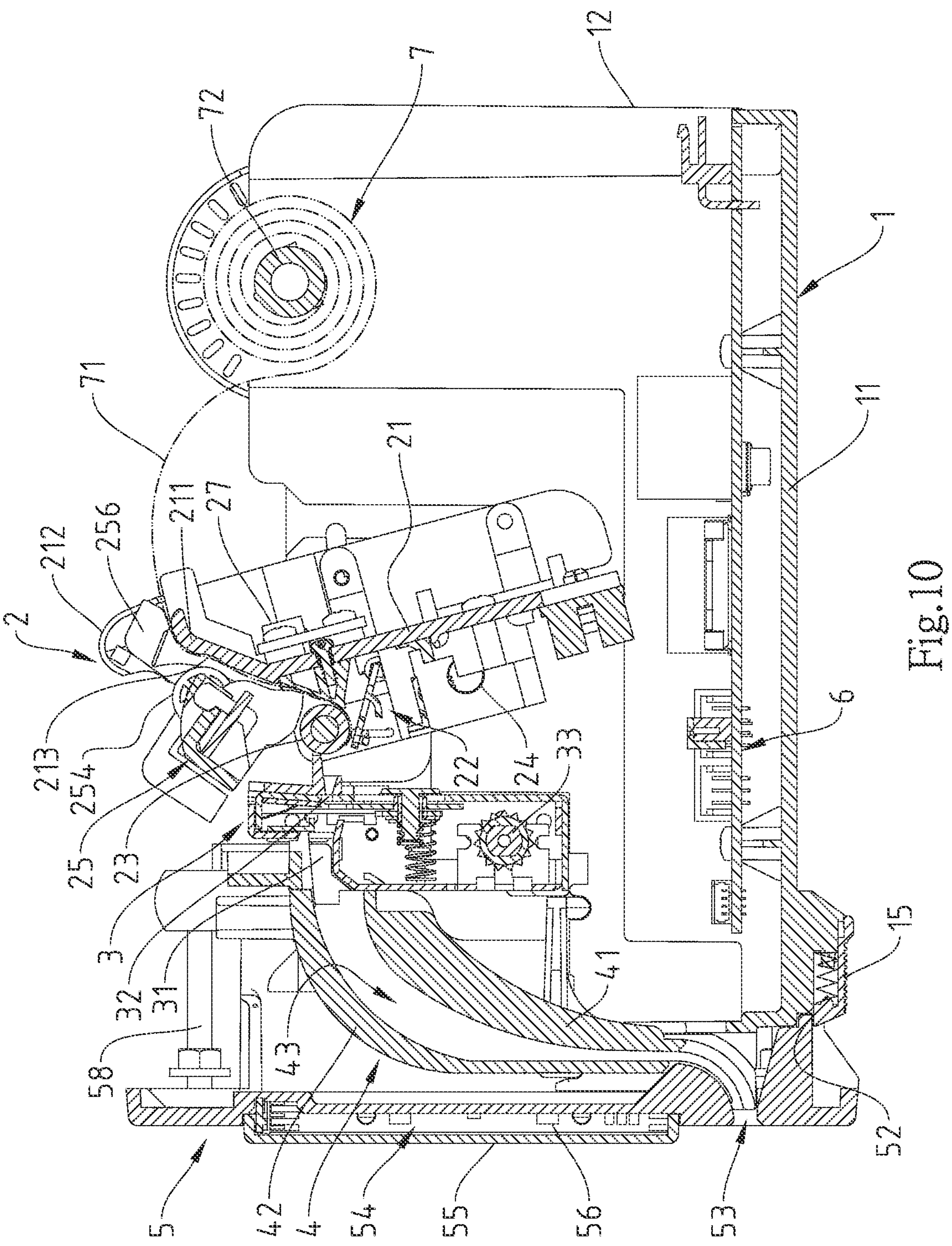
FIG. 10 is a diagrammatic view illustrating installation of a paper sheet onto the printing device of the printer of the embodiment according to the present invention.

The printing device 2 includes a printer seat 21, a printer head 22, a paper delivering roller 23, and a motor 24 (see FIGS. 5 and 9). The printer seat 21 is fixed to an intermediate section of the frame 1 by screws 28. A guiding board 211 extends rearwards from a front side of an upper section of the printer seat 21. Two limiting boards 212 are disposed on two sides of the guiding board 211. The printer head 22 is disposed on a front side of a lower section of the printer seat 21. The paper delivering roller 23 is rotatably mounted to the printer head 22. The motor 24 is configured to drive the paper delivering roller 23 which pulls the paper sheet 71 of the paper roll 7 (see FIGS. 10 and 12) to pass through the guiding board 211 and the printer head 22 for printing.

Figure 7:
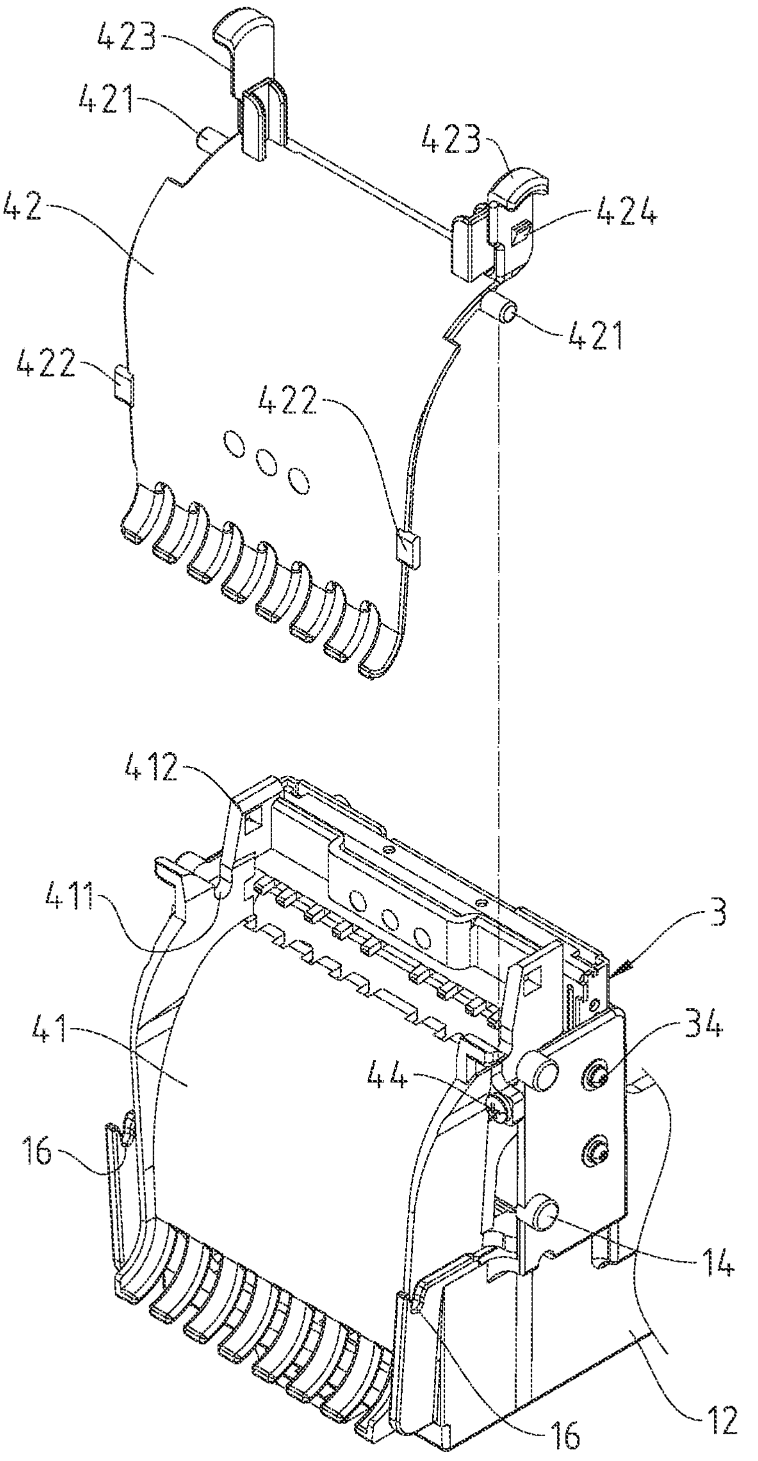
FIG. 7 is an exploded, perspective view illustrating a paper output seat and a paper output cover of the printer of the embodiment according to the present invention.

The paper cutting device 3 is fixed to a front section of the frame 1 by screws 34 (see FIG. 7). The paper cutting device 3 includes a paper input passage 31 (see FIG. 12) and is configured to drive a paper cutter 32 by a driving unit 33. The paper sheet 71 of the paper roll 7 moves forwards from the printer head 22 to pass through the paper input passage 31.

The paper output device 4 includes a paper output seat 41 and a paper output cover 42 (see FIGS. 7 and 9). The paper outlet seat 41 is fixed by screws 44 to a front side of the paper cutting device 3 and the frame 1. A paper output passage 43 is defined between the paper output seat 41 and the paper output cover 42. A rear end of the paper output passage 43 intercommunicates with the paper input passage 31 of the paper cutting device 3.

The panel 5 is disposed on a front end of the frame 1. The panel 5 includes two fixing boards 51 respectively extending rearwards from two sides of the panel 5 and a bottom board 52 (see FIG. 3). Each of the two fixing boards 51 includes a plurality of fixing holes 511. Fixing screws 58 extend through fixing holes 57 at a front side of the panel 5, fixing the panel 5 to a surface of an automatic processing machine (not shown). Furthermore, a paper outlet 53 is formed in a lower section of the panel 5 and intercommunicates with a front end of the paper output passage 43.

The circuit module 6 is disposed on the frame seat 11 of the frame 1 and is electrically connected to the motor 24 of the printing device 2 and the driving unit 33 of the paper cutting device 3.

Figure 3:
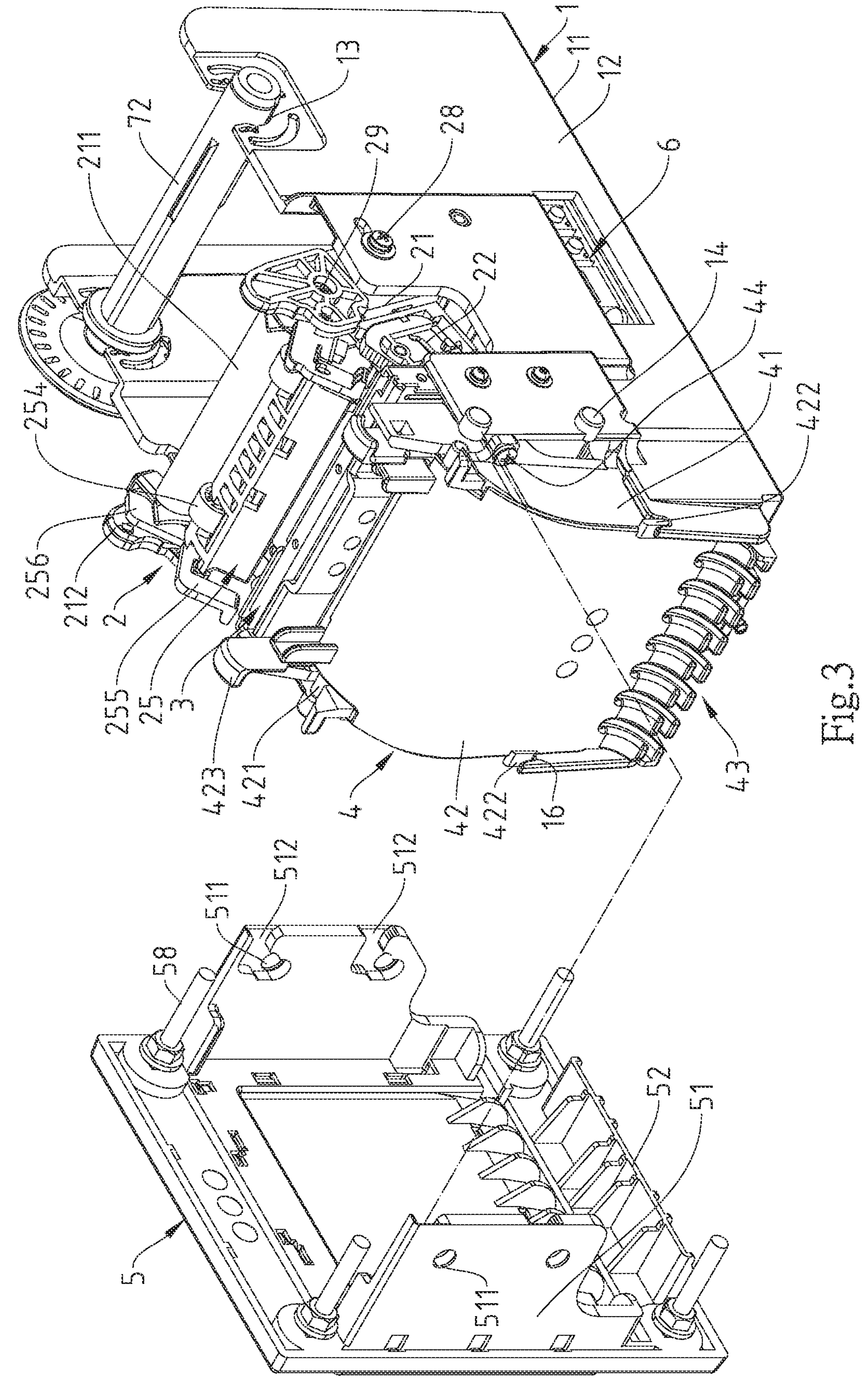
FIG. 3 is an exploded, perspective view of the printer of the embodiment according to the present invention.

The printer according to the present invention is characterized in that each of the two limiting boards 212 of the printer seat 21 includes a plurality of fixing protrusions 14 and a plurality of positioning grooves 16 (see FIG. 3). Each of the two fixing boards 51 of the panel 5 includes a plurality of fixing holes 511 and a plurality of guiding grooves 512. Each of the plurality of guiding grooves 512 extends rearwards from an associated fixing hole 511. Each of the plurality of fixing protrusions 14 extends through an associated guiding groove 512 and engages with an associated fixing hole 511.

Furthermore, each of the two limiting boards 212 of the printer seat 21 includes a first engaging hole 214 (see FIG. 5) located above the guiding board 211. Each of the two limiting boards 212 further includes an axle hole 216 in front of the guiding board 211. The front side of the guiding board 211 of the printer seat 21 includes an arcuate portion 213 extending in a transverse direction.

Figure 11:
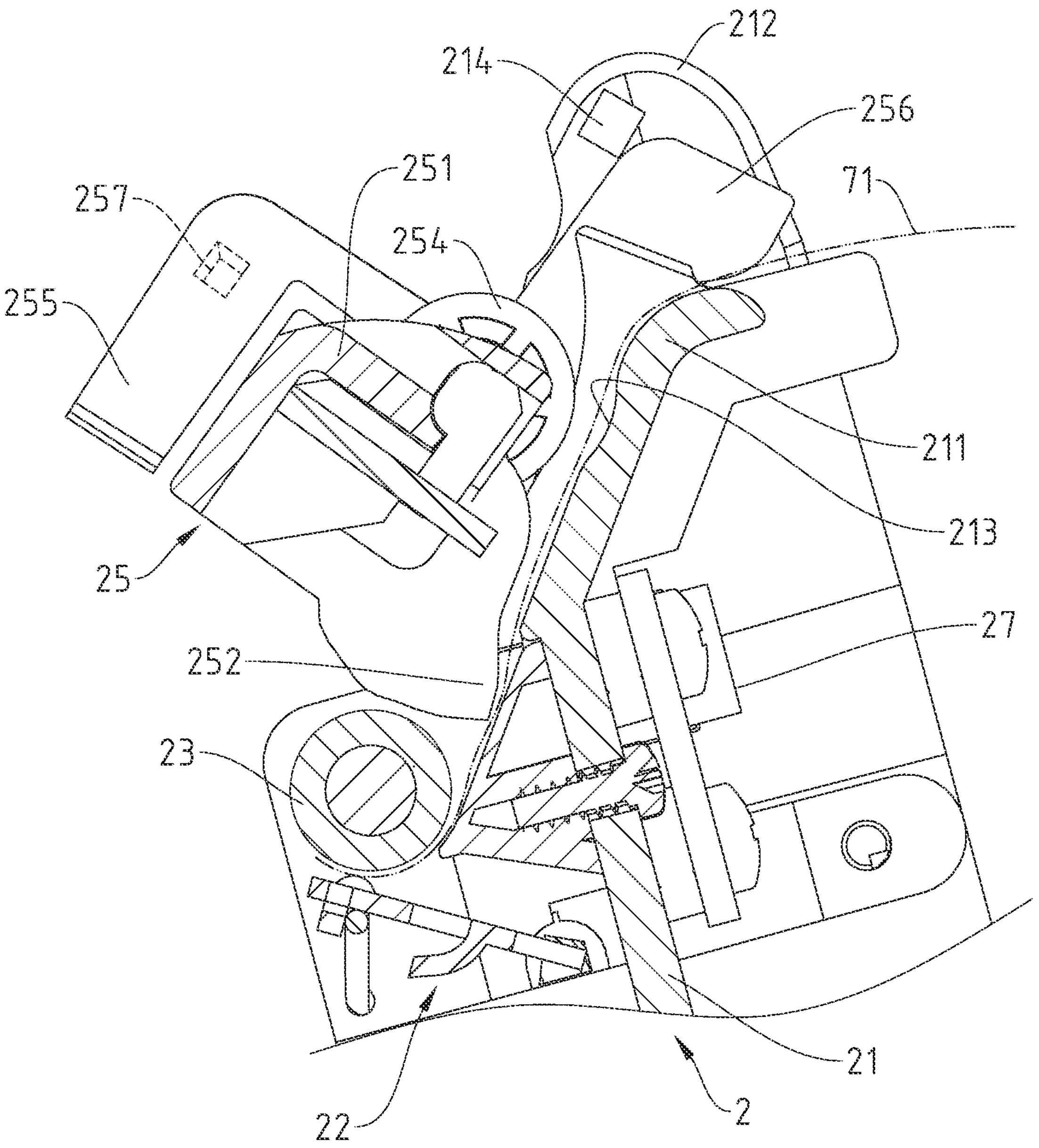
FIG. 11 is an enlarged view illustrating installation of the paper sheet onto the printing device of the printer of the embodiment according to the present invention.

The printing device 2 further includes a guiding member 25 (see FIGS. 3-6) having a guiding body 251 extending in the transverse direction. The guiding body 251 further includes two axles 253 respectively on two ends thereof. The two axles 253 are pivotably coupled in the axle holes 216 of the two limiting boards 212. The guiding body 251 includes a guiding piece 252 extending forwards. At least one guiding roller 254 is rotatably mounted to a rear side of the guiding body 251. Each of the two ends of the guiding body 251 further includes a retaining arm 255 extending upwards and having a first engaging block 257. Each first engaging block 257 is engageable with an associated first engaging hole 214 to form a positioned state, such that a paper guiding gap (see FIG. 13) is formed between the at least one guiding wheel 254 and the guiding board 211 and is adjacent to the front side of the guiding board 211. Furthermore, the rear edge of the at least one guiding roller 254 enters the arcuate portion 213. Thus, the paper sheet 71 contacts with the guiding board 211 and the at least one guiding wheel 254 and passes in between the guiding board 211 and the at least one guiding wheel 254. This overcomes the curly tendency of the paper sheet 71. When a worker presses the two retaining arms 255 of the guiding member 25 to pivot inwards, the first engaging blocks 257 of the two retaining arms 255 disengage from the first engaging holes 214 to form an unpositioned state, such that the guiding body 251 is pivotable forward to pivot the at least one guiding roller 254 forwards and upwards away from the guiding board 211 (see FIGS. 9-11), permitting installation of a new paper sheet 71.

Furthermore, the printing device 2 includes a micro switch 27 (see FIG. 13) disposed on the rear side of the printer seat 21. An activation arm 256 (see FIGS. 4 and 5) protrudes rearwards from one of the two ends of the guiding body 251 and extends rearwards through a groove 215 beyond a side of the guiding board 211. When the guiding body 251 is in the positioned state, a distal end of the activation arm 256 activates the micro switch 27. Furthermore, the micro switch 27 is electrically connected to the circuit module 6, such that the printer is in an operable state.

Figure 4:
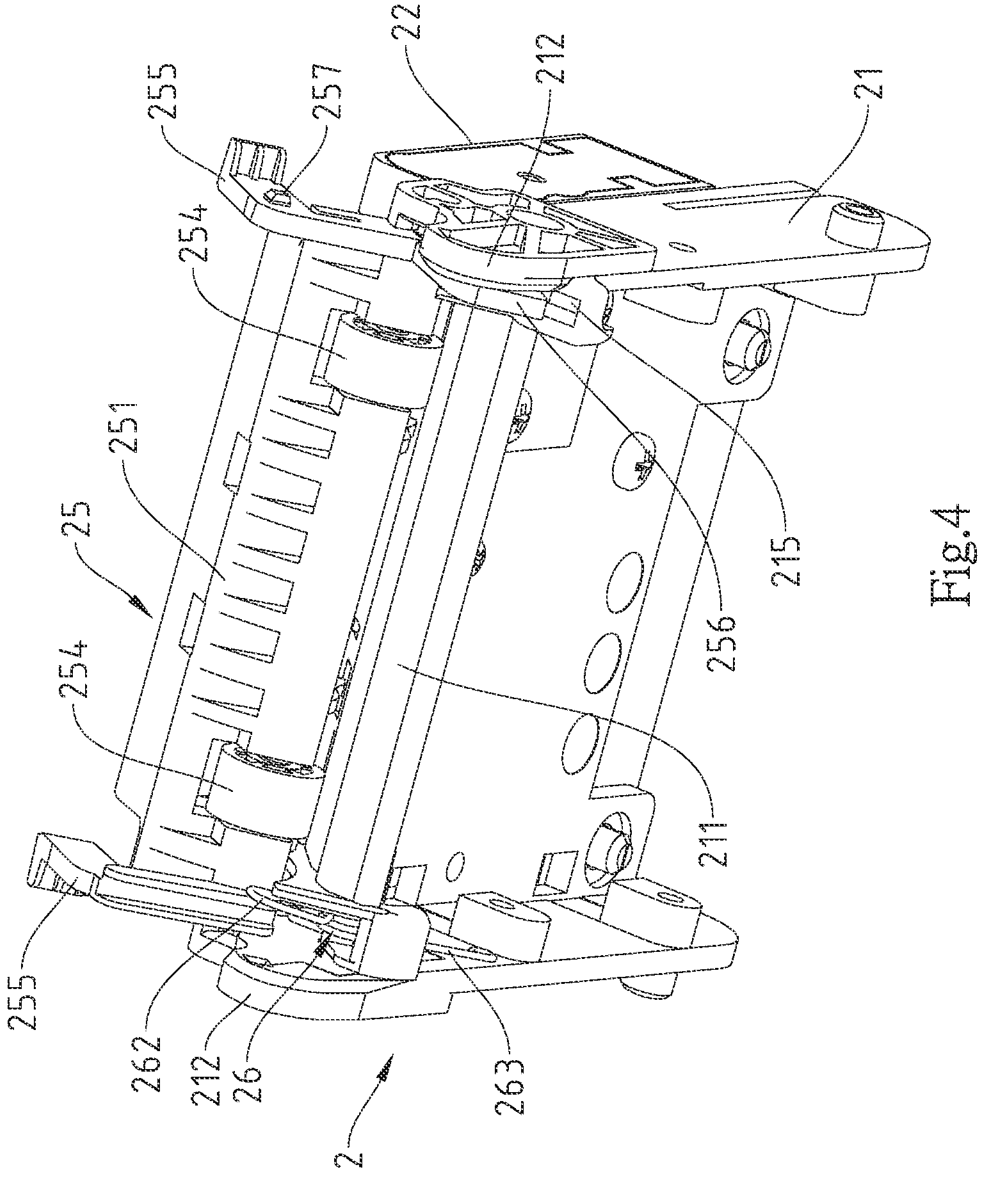
FIG. 4 is a perspective view of the printing device of the printer of the embodiment according to the present invention with the guiding member of the printing device in the unpositioned state.
Figure 6:
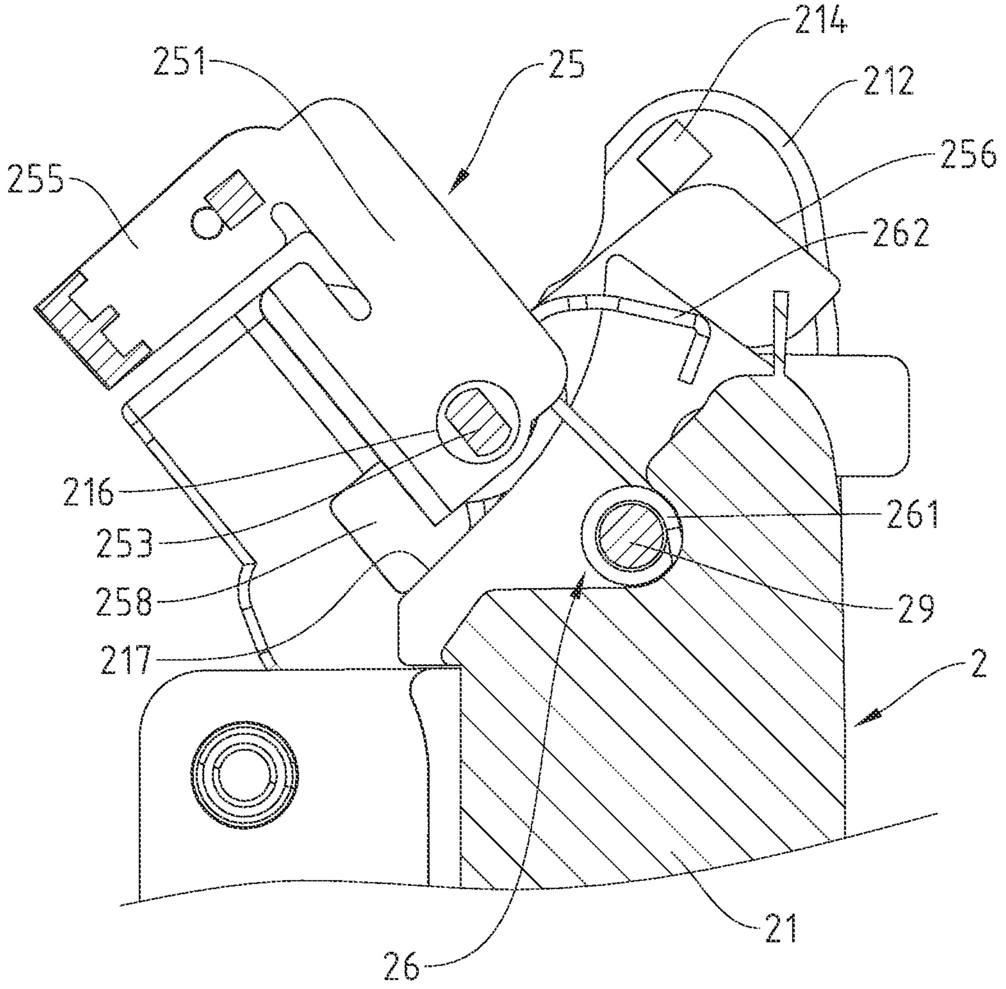
FIG. 6 is a partial, cross sectional view illustrating the guiding member in the unpositioned state.

The printing device 2 further includes two springs 26 (see FIGS. 4-6). Each of the two springs 26 is provided between one of two sides of the printer seat 21 and the guiding body 251. Each of the two springs 26 includes a coiled portion 261 at an intermediate portion thereof and two tangs 262, 263 extending from two ends of the coiled portion 261. The printer further comprises two screws 29. Each of the two screws 29 extends through one of the two limiting boards 212 into the coiled portion 261 of an associated spring 26 whose two tangs 262, 263 press against the printer seat 21 and the guiding body 251, respectively. Each of the two limiting boards 212 of the printer seat 21 includes a stop wall 217 on an inner side thereof. Each of the two ends of the guiding body 251 includes a stop block 258 corresponding to a respective stop wall 217. When the guiding body 251 is in the unpositioned state, each spring 26 pushes the guiding body 251 to pivot forwards, such that each stop block 258 abuts downwards against an associated stop wall 217.

Furthermore, the paper output seat 41 of the paper output device 4 includes two positioning grooves 411 (see FIGS. 3 and 7) formed in two sides of an upper section of the paper output seat 41. Each of the two positioning grooves 411 has an upwardly facing opening. The paper output cover 42 includes positioning protrusions 421, 422 on upper and lower sections thereof and located corresponding to the positioning grooves 411 and 16. The paper output cover 42 covers the paper output seat 41 from top to bottom and is secured to the paper output seat 41. The paper output cover 42 includes two elastic retaining arms 423 respectively extending upwards from two sides of a top portion of the paper output cover 42. Each of the two elastic retaining arms 423 includes a second engaging block 424 engaged in an associated second engaging hole 412 for positioning. The paper sheet 71 (see FIG. 12) extending through the paper output passage 43 moves forward through the paper outlet 53 of the panel 5. When a paper jam occurs in the printer (such as the paper sheet 71 gets stuck in the paper output passage 43), a worker can press the two elastic resilient arms 423 of the paper output cover 42 inwards to disengage the second engaging blocks 424 from the second engaging holes 412, and the paper output cover 42 is moved upwards to fix the paper jam.

Figure 8:
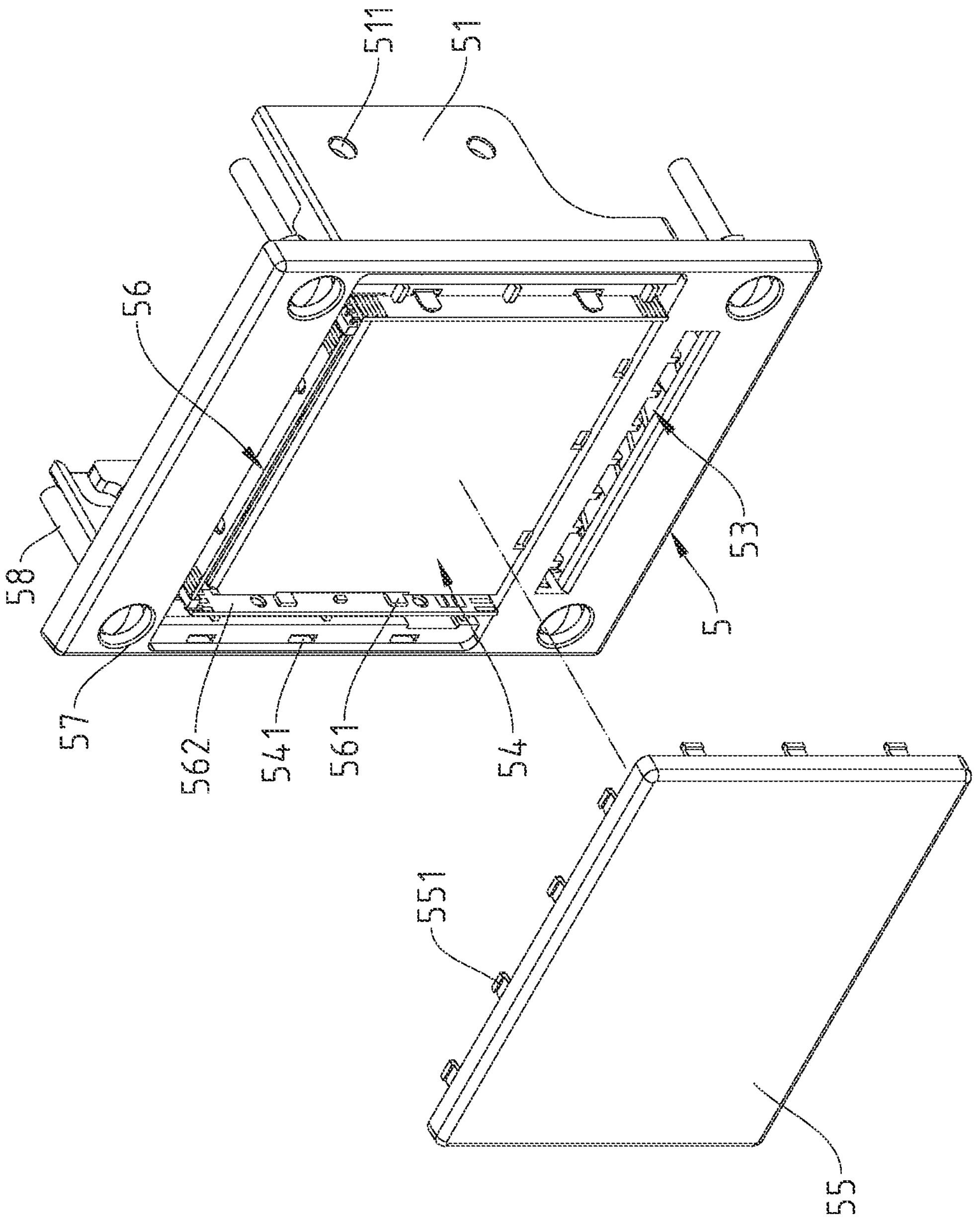
FIG. 8 is an exploded, perspective view of a panel and a panel lid of the printer of the embodiment according to the present invention.

Furthermore, the front panel 5 includes a front side having a receiving space 54 and a panel lid 55 that is permeable to light (see FIGS. 1, 3, and 8). An indicating light unit 56 and a plurality of third engaging holes 541 are disposed around the receiving space 54. The indicating light unit 56 includes a plurality of indicating lights 561 and a circuit board 562 and is electrically connected to the circuit module 6. The panel lid 55 includes a plurality of third engaging blocks 551 engaged in the plurality of third engaging holes 541 for positioning. The panel lid 55 covers the receiving space 54 and the indicating light unit 56. Thus, the indicating light unit 56 emits light towards the panel lid 55 to indicate the operating status of the printer, whereas the panel lid 55 prevents unauthorized detachment.

With reference to FIGS. 4, 5, 10, and 11, when it is desired to install a new paper sheet 71 around the spool 72 of the paper roll 7, the first engaging blocks 257 of the retaining arms 255 are disengaged from the first engaging holes 214 to form an unpositioned state, the worker pivots the guiding body 251 forwards to pivot the at least one guiding roller 254 forwards and upwards away from the guiding board 211, and the guiding piece 252 pivots rearwards and downwards to a position adjacent to a lower section of the guiding board 211, forming a paper insertion gap for guiding the new paper sheet 71 to pass therethrough, such that a front end of the new paper sheet 71 is guided downwards to contact with the guiding piece 252 and the guiding board 211 and to pass in between the guiding piece 252 and the guiding board 211 to thereby contact with the paper delivering roller 23. Then, the worker pivots the guiding body 251 rearwards back to the positioned state, completing installation of the new paper sheet 71 (see FIG. 12).

Figure 12:
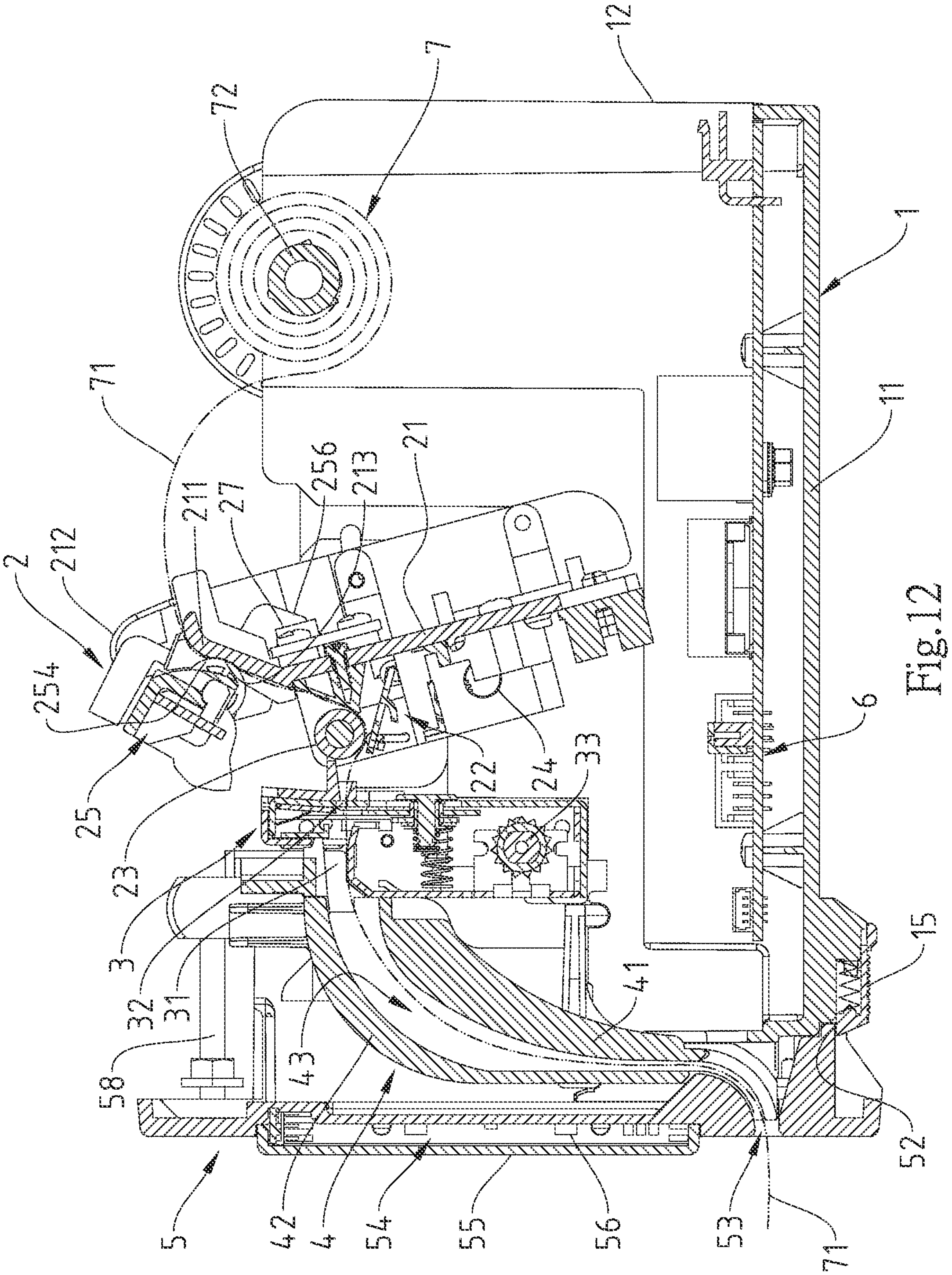
FIG. 12 is a diagrammatic view illustrating use of the printer of the embodiment according to the present invention.
Figure 13:
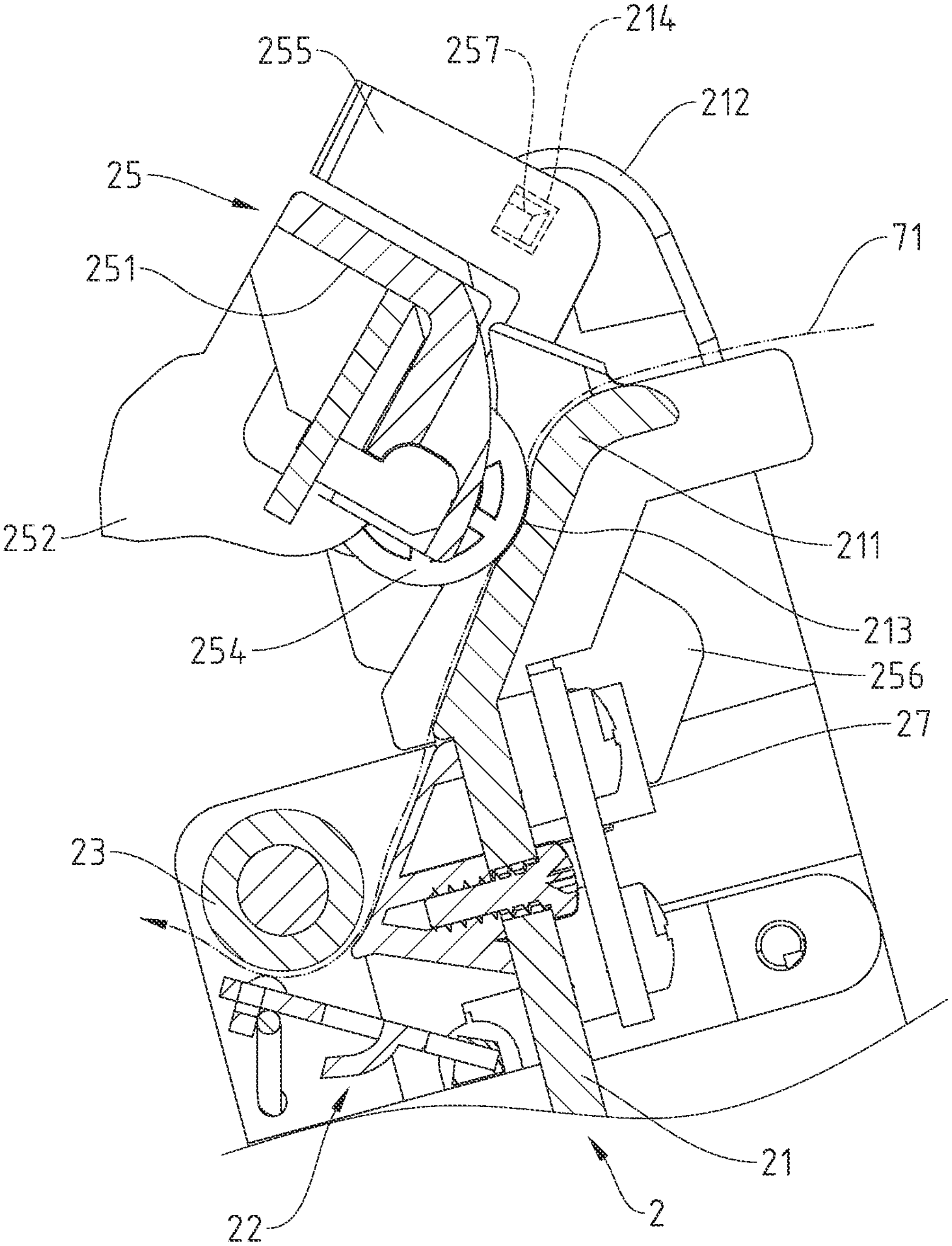
FIG. 13 is an enlarged view illustrating guiding of the paper sheet by the printing device of the printer of the embodiment according to the present invention.

With reference to FIGS. 5, 12, and 13, when the printer is in use, the first engaging blocks 257 of the retaining arms 255 of the guiding member 25 of the printing device 2 engage with the first engaging holes 214 to form a positioned state, and the at least one guiding wheel 254 is adjacent to the front side of the guiding board 211 to form a paper guiding gap. Thus, the paper sheet 71 is guided to contact with the guiding board 211 and the at least one guiding wheel 254 and to pass in between the guiding board 211 and the at least one guiding wheel 254. The paper delivering roller 23 can pull the paper sheet 71 forward to pass through the printer head 22 for printing. Furthermore, the paper sheet 71 is pushed forward to pass through the paper input passage 31 of the paper cutting device 3 and then enters the paper output passage 43 of the paper output device 4 and the paper outlet 53 of the panel 5. Next, the printer controls the driving unit 33 of the paper cutting device 3 to actuate the paper cutter 32 to cut the paper sheet 71. The front end of the paper sheet 71 is exposed outside of the paper outlet 53 of the panel 5, such that the user can fetch a detailed list or receipt after printing.

Although specific embodiments have been illustrated and described, numerous modifications and variations are still possible without departing from the scope of the invention. The scope of the invention is limited by the accompanying claims.

The invention claimed is:

1. A printer comprising a frame, a paper roll, a printing device, a paper cutting device, a paper output device, and a panel, with the paper roll, the printing device, the paper cutting device, the paper output device, and the panel disposed, from rear to front in sequence, on the frame, wherein the paper roll includes a paper sheet mounted around a spool having two ends rotatably mounted to two sides at a rear section of the frame, wherein the printing device includes a printer seat, a printer head, a paper delivering roller, and a motor, wherein the printer seat is disposed on an intermediate section of the frame, wherein a guiding board extends rearwards from a front side of an upper section of the printer seat, wherein two limiting boards are disposed on two sides of the guiding board, wherein the printer head is disposed on a front side of a lower section of the printer seat, wherein the paper delivering roller is rotatably mounted to the printer head, wherein the motor is configured to drive the paper delivering roller which pulls the paper sheet of the paper roll to pass through the guiding board and the printer head for printing, wherein the paper cutting device is disposed on a front section of the frame, wherein the paper cutting device includes a paper input passage and a paper cutter, wherein the paper sheet of the paper roll moves forwards to pass through the paper input passage, wherein the paper output device includes a paper output seat and a paper output cover, wherein a paper output passage is defined between the paper output seat and the paper output cover, wherein a rear end of the paper output passage intercommunicates with the paper input passage of the paper cutting device, wherein the panel is disposed on a front end of the frame, wherein a paper outlet is formed in a lower section of the panel and intercommunicates with a front end of the paper output passage, characterized in that:

each of the two limiting boards of the printer seat includes a first engaging hole located above the guiding board, wherein each of the two limiting boards further includes an axle hole in front of the guiding board, wherein the printing device further includes a guiding member having a guiding body extending in a transverse direction, wherein the guiding body further includes two axles respectively on two ends thereof, wherein the two axles are pivotably coupled in the axle holes of the two limiting boards, wherein the guiding body includes a guiding piece extending forwards, wherein at least one guiding roller is rotatably mounted to a rear side of the guiding body, wherein each of the two ends of the guiding body further includes a retaining arm extending upwards and having a first engaging block, wherein each first engaging block is engageable with an associated first engaging hole to form a positioned state, such that a paper guiding gap is formed between the at least one guiding wheel and the guiding board and is adjacent to the front side of the guiding board, thereby guiding the paper sheet to contact with the guiding board and the at least one guiding wheel and to pass in between the guiding board and the at least one guiding wheel, and wherein the paper delivering roller pulls the paper sheet forward to pass through the printer head for printing, wherein when a new paper sheet is installed around the spool of the paper roll, the first engaging blocks of the retaining arms are disengaged from the first engaging holes to form an unpositioned state, the guiding body is pivotable forward to pivot the at least one guiding roller forwards and upwards away from the guiding board, and the guiding piece is pivotable rearwards and downwards to a position adjacent to a lower section of the guiding board, forming a paper insertion gap for guiding the new paper sheet to pass therethrough, such that a front end of the new paper sheet is capable of being guided downwards to contact with the guiding piece and the guiding board and to pass in between the guiding piece and the guiding board to thereby contact with the paper delivering roller, and wherein the guiding body is then pivotable rearwards back to the positioned state, completing installation of the new paper sheet.

2. The printer as claimed in claim 1, wherein the front side of the guiding board of the printer seat includes an arcuate portion corresponding to the at least one guiding roller, wherein when the guiding body is in the positioned state, a rear edge of the at least one guiding roller enters the arcuate portion, and the paper sheet contacts with the at least one guiding roller and the arcuate portion and is passable in between the at least one guiding roller and the arcuate portion.

3. The printer as claimed in claim 1, wherein a micro switch is disposed on the rear side of the printer seat, wherein an activation arm protrudes rearwards from one of the two ends of the guiding body and extends rearwards beyond a side of the guiding board, and wherein when the guiding body is in the positioned state, a distal end of the activation arm activates the micro switch.

4. The printer as claimed in claim 1, wherein each of the two limiting boards of the printer seat includes a stop wall on an inner side thereof, wherein each of the two ends of the guiding body includes a stop block corresponding to a respective stop wall, and wherein when the guiding body is in the unpositioned state, each stop block abuts downwards against an associated stop wall.

5. The printer as claimed in claim 4, further comprising two springs, wherein each of the two springs is provided between one of two sides of the printer seat and the guiding body, and wherein when the guiding body is in the unpositioned state, each spring pushes the guiding body to pivot forwards.

6. The printer as claimed in claim 5, wherein each of the two springs includes a coiled portion at an intermediate portion thereof and two tangs extending from two ends of the coiled portion, wherein the printer further comprises two screws, wherein each of the two screws extends through one of the two limiting boards into the coiled portion of an associated spring whose two tangs press against the printer seat and the guiding body, respectively.

7. The printer as claimed in claim 1, wherein the paper output seat is fixed to the front side of the paper cutting device and the frame, wherein the paper output seat includes two second engaging holes respectively formed in two sides of a top portion of the paper output seat, wherein the paper output cover covers the paper output seat from top to bottom and is mounted to the paper output seat, wherein the paper output cover includes two elastic retaining arms respectively extending upwards from two sides of a top portion of the paper output cover, and wherein each of the two elastic retaining arms includes a second engaging block engaged in an associated second engaging hole for positioning.

8. The printer as claimed in claim 7, wherein the paper output seat includes two positioning grooves formed in two sides of an upper section of the paper output seat, wherein each of the two positioning grooves has an upwardly facing opening, and wherein the paper output cover includes two positioning protrusions formed on an upper section of the paper output cover.

9. The printer as claimed in claim 1, wherein the panel includes two fixing boards respectively extending rearwards from two sides of the panel, wherein each of the two fixing boards includes a plurality of fixing holes and a plurality of guiding grooves, wherein each of the plurality of guiding grooves extends rearwards from an associated fixing hole, wherein the frame includes a plurality of fixing protrusions on two sides of the front section of the frame, and wherein each of the plurality of fixing protrusions extends through an associated guiding groove and engages with an associated fixing hole.

10. The printer as claimed in claim 1, wherein the front panel includes a front side having a receiving space and a panel lid that is permeable to light, wherein an indicating light unit and a plurality of third engaging holes are disposed around the receiving space, wherein the panel lid includes a plurality of third engaging blocks engaged in the plurality of third engaging holes for positioning, and wherein the panel lid covers the receiving space and the indicating light unit.

* * * * *